(12) United States Patent  (10) Patent No.: US 9,724,818 B2
Wilson  (45) Date of Patent: Aug. 8, 2017

(54) BENCH WITH INTEGRATED LIFTABLE STORAGE

(71) Applicant: Bill Wilson, Albertville, AL (US)

(72) Inventor: Bill Wilson, Albertville, AL (US)

( * ) Notice: Subject to any disclaimer, the term of this patent is extended or adjusted under 35 U.S.C. 154(b) by 0 days.

(21) Appl. No.: 14/866,865

(22) Filed: Sep. 26, 2015

(65) Prior Publication Data

US 2017/0087712 A1    Mar. 30, 2017

(51) Int. Cl.

| | |
|---|---|
| *A47B 9/00* | (2006.01) |
| *B25H 1/16* | (2006.01) |
| *F16M 11/42* | (2006.01) |
| *B25H 1/00* | (2006.01) |
| *B25H 1/12* | (2006.01) |
| *B25H 1/10* | (2006.01) |

(52) U.S. Cl.
CPC ............... *B25H 1/16* (2013.01); *B25H 1/005* (2013.01); *B25H 1/10* (2013.01); *B25H 1/12* (2013.01); *F16M 11/42* (2013.01)

(58) Field of Classification Search
CPC .................... B66B 9/022; A47B 9/04
USPC ................... 108/83, 84, 86–88, 144.11, 147; 312/312; 187/270; 144/285, 286.1, 144/286.5
See application file for complete search history.

(56) References Cited

U.S. PATENT DOCUMENTS

| | | | |
|---|---|---|---|
| 1,287,175 A | 12/1918 | Anderson | |
| 2,505,658 A | 4/1950 | Wilson | |
| 3,025,651 A * | 3/1962 | Stanley | .................. A47F 9/042 |
| | | | 186/66 |
| 4,465,114 A | 8/1984 | Schumacher | |
| 4,483,573 A | 11/1984 | Keller | |
| 5,431,206 A | 7/1995 | McAllister | |
| 5,937,924 A * | 8/1999 | Cooper | .................. B25H 1/005 |
| | | | 108/143 |
| D457,704 S | 5/2002 | Fiscus et al. | |
| 7,089,980 B2 | 8/2006 | Rulli | |
| 8,505,597 B2 | 8/2013 | Sharperson | |
| 2013/0285302 A1 | 10/2013 | Helm | |

FOREIGN PATENT DOCUMENTS

WO    WO2007063310    6/2007

* cited by examiner

*Primary Examiner* — Matthew Ing

(57) ABSTRACT

A bench with integrated, liftable storage for providing integrated, liftable storage includes a base. The base comprises a lift module that has a frame which is box shaped. A platform and a lifter are positioned in an interior space defined by the frame. The lifter is coupled to the platform, such that the lifter can raise or lower the platform within the interior space. A top is positioned on and coupled to an upper face of the frame. An opening is positioned in the top.

13 Claims, 5 Drawing Sheets

BENCH WITH INTEGRATED LIFTABLE STORAGE

BACKGROUND OF THE DISCLOSURE

Field of the Disclosure

The disclosure relates to benches and more particularly pertains to a new bench for providing integrated, liftable storage.

SUMMARY OF THE DISCLOSURE

An embodiment of the disclosure meets the needs presented above by generally comprising a base. The base comprises a lift module that has a frame which is box shaped. A platform and a lifter are positioned in an interior space defined by the frame. The lifter is coupled to the platform, such that the lifter can raise or lower the platform within the interior space. A top is positioned on and coupled to an upper face of the frame. An opening is positioned in the top.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
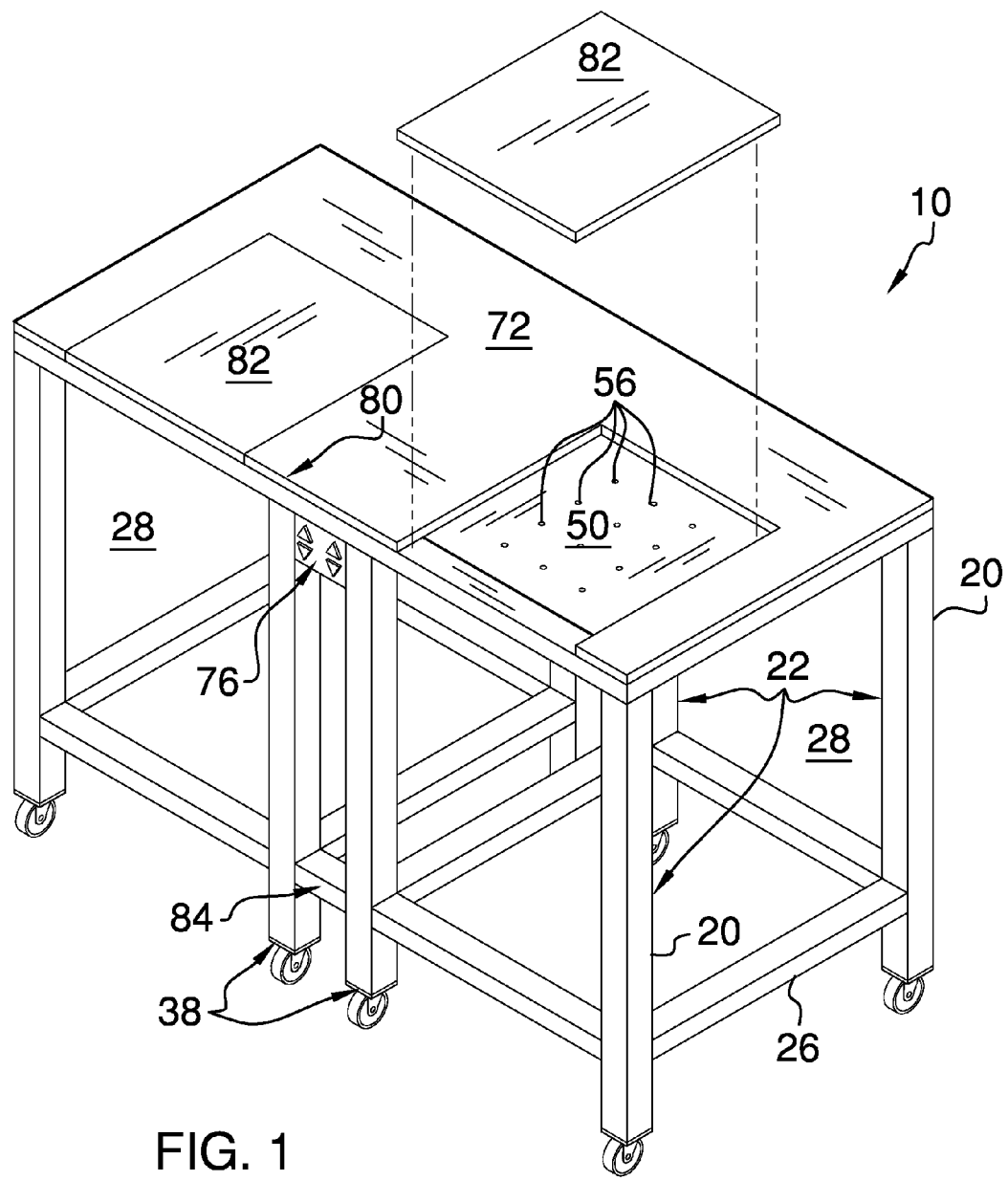
FIG. 1 is an isometric perspective view of a bench with integrated, liftable storage according to an embodiment of the disclosure.
Figure 2:
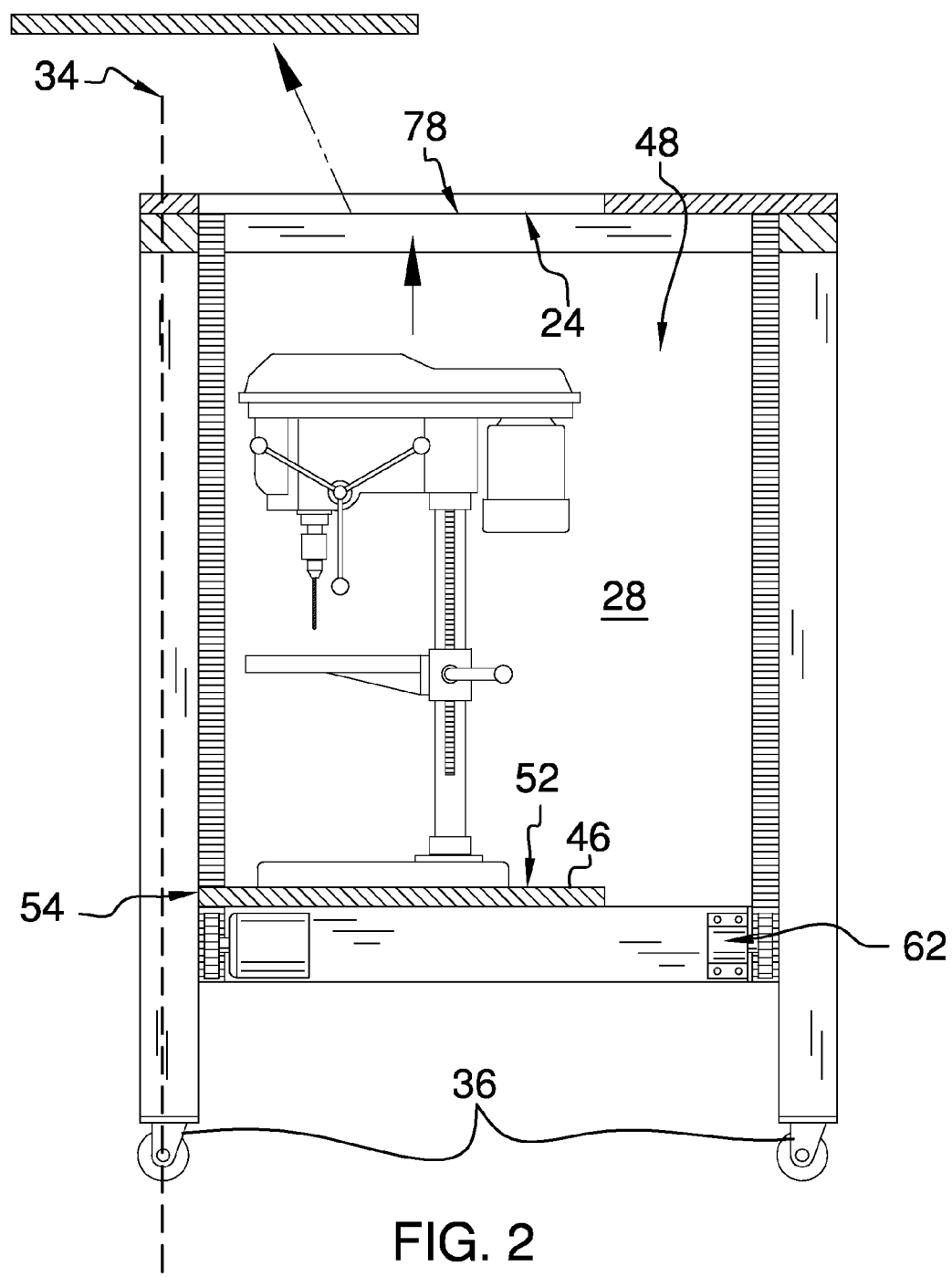
FIG. 2 is a side-sectional view of an embodiment of the disclosure.
Figure 3:
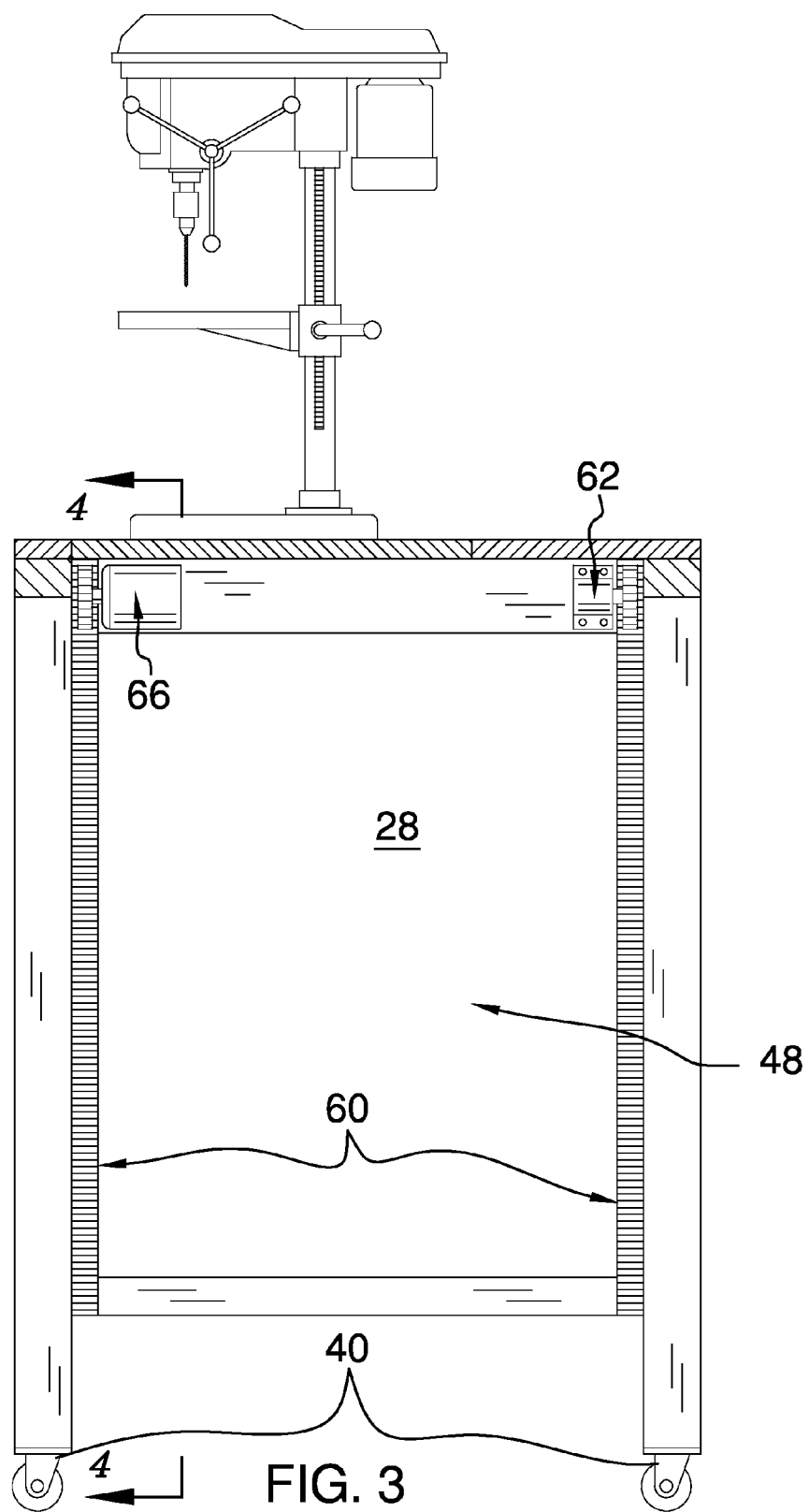
FIG. 3 is a side-sectional view of an embodiment of the disclosure.
Figure 4:
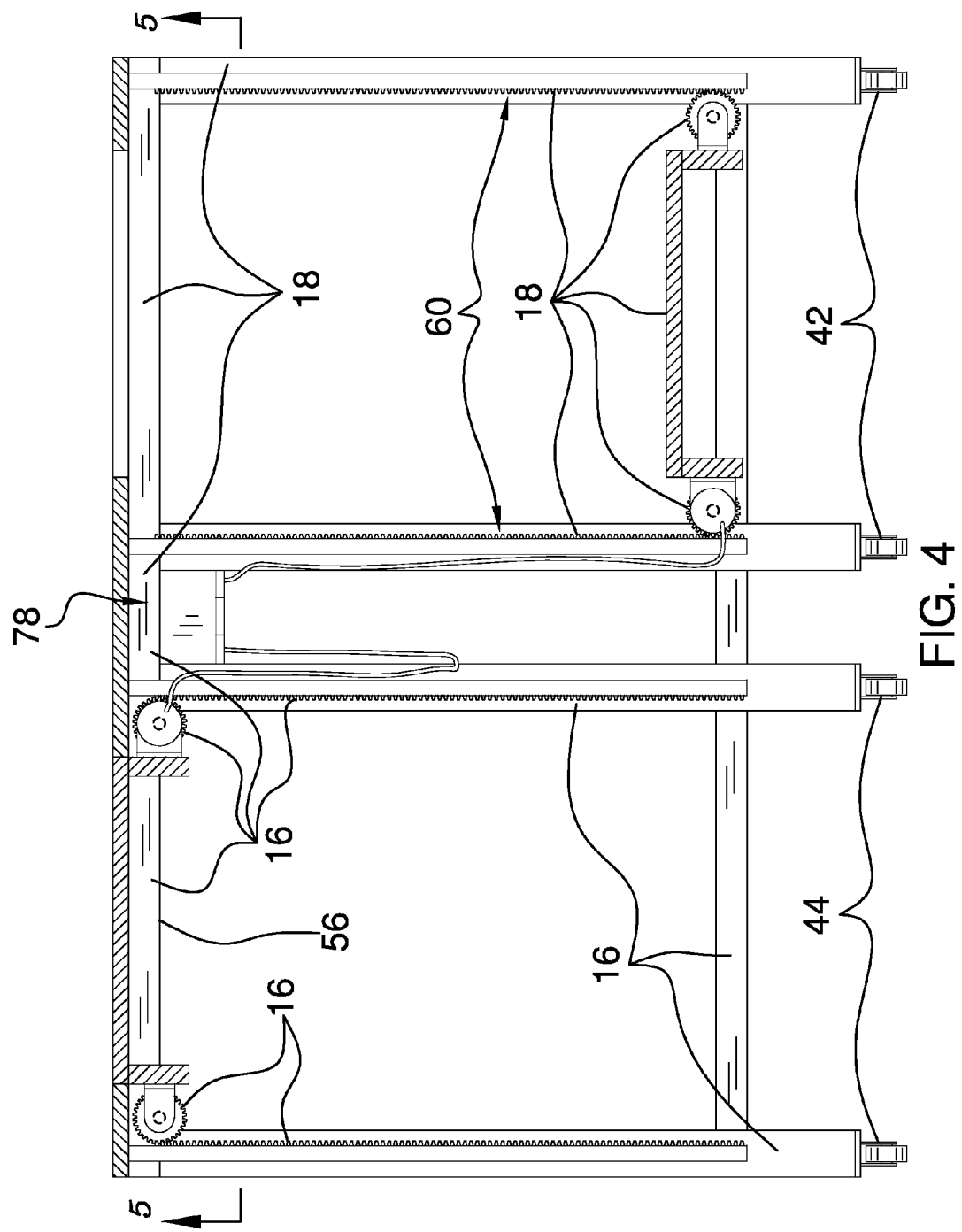
FIG. 4 is a front-sectional view of an embodiment of the disclosure.
Figure 5:
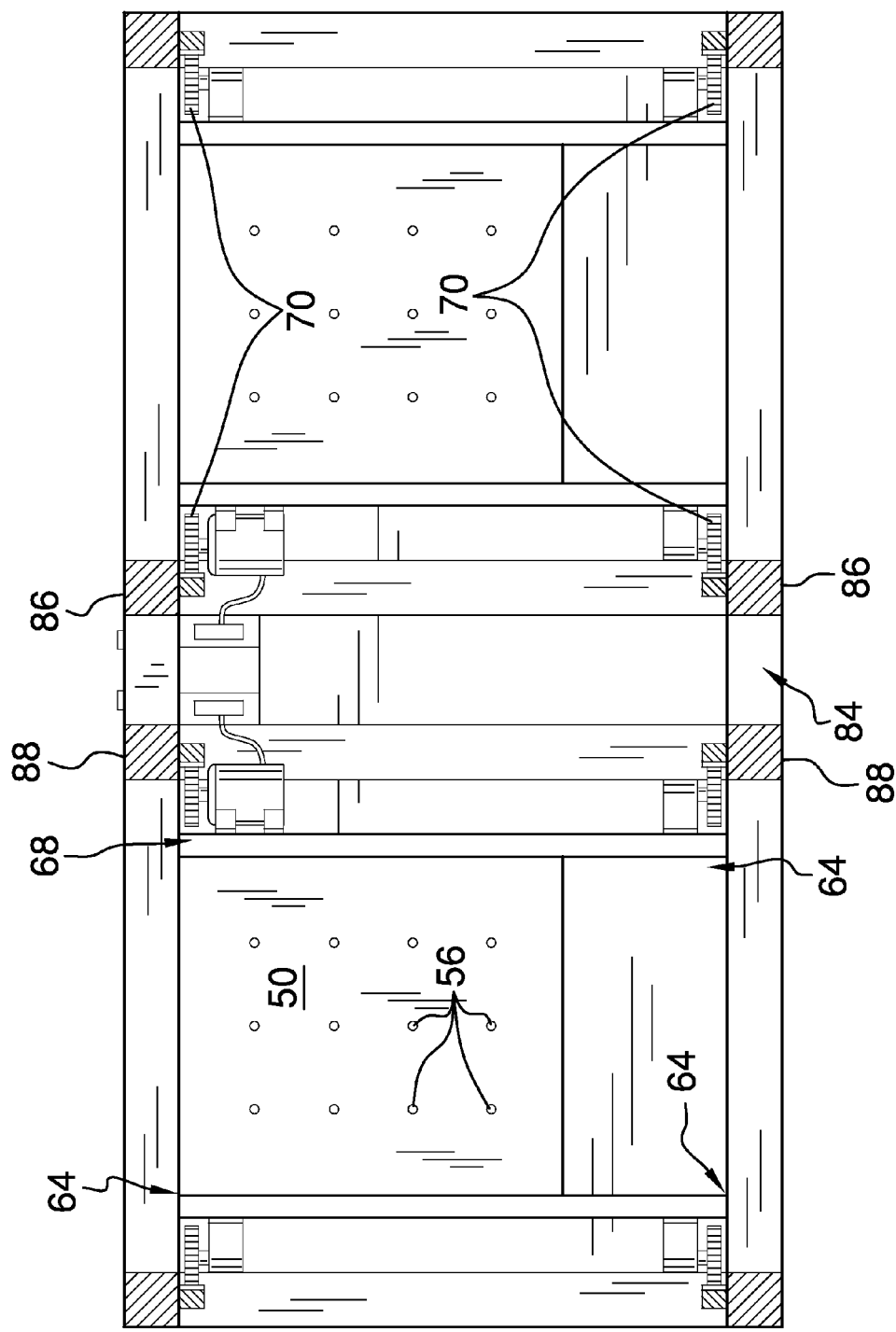
FIG. 5 is a bottom-sectional view of an embodiment of the disclosure.

With reference now to the drawings, and in particular to FIGS. 1 through 5 thereof, a new bench embodying the principles and concepts of an embodiment of the disclosure and generally designated by the reference numeral 10 will be described.

As best illustrated in FIGS. 1 through 5, the bench 10 with integrated, liftable storage generally comprises a base 12. The base 12 comprises a lift module 14. Preferably, the base 12 comprises a first lift module 16 and a second lift module 18. The lift module 12 has a frame 20 that is box shaped and has a plurality of verticals 22 that extend from an upper face 24 through and past a bottom 26. The frame 20 has four lateral sides 28, which may be open. The bottom 26 comprises a plurality of laterals 30. The upper face 24 comprises a plurality of connectors 32. The verticals 22, the laterals 30, and the connectors 32 have rectangular profiles when viewed along a respective longitudinal axis 34. A plurality of bases 36 is coupled to the bottom ends 38 of the verticals 22. The bases 36 may be feet 40, wheels 42 or castors 44. A platform 46 is positioned in an interior space 48 defined by the frame 20. The platform 46 is rectangular. A mount 50 is coupled to and positioned on an upper surface 52 of the platform 46. The mount 50 is positioned proximate to a front end 54 of the platform 46. A plurality of holes 56 is positioned in the mount 50.

A lifter 58 is positioned in the interior space 48. The lifter 58 is coupled to the platform 46, such that the lifter 58 can raise or lower the platform 46 within the interior space 48. The lifter 58 comprises a set of four rack gears 60. The set of four rack gears 60 is coupled to associated verticals 22 within the interior space 48. The lifter 58 has a set of three blocks 62. Each of the set of three blocks 62 is coupled proximate to an associated corner 64 of the platform 46. A motor 66 is coupled to a fourth corner 68 of the platform 46. The lifter 58 has a set of four pinion gears 70. Three gears 70 are operationally coupled to associated blocks 62 and to associated rack gears 60. One pinion gears 70 is operationally coupled to the motor 66 and to an associated four rack gear 60.

A top 72 is positioned on and coupled to the upper face 52 of the frame 20. A power supply 74 is coupled to an associated one of the verticals 22 proximate to the top 74. The power supply 74 is operationally coupled to the motor 66. A control panel 76 is coupled to the power supply 74. The control panel 76 is operationally coupled to the power supply 74 and the motor 66. An opening 78 is positioned in the top 72 proximate to a front edge 80 of the top 72. The opening 78 is rectangular. The bench comprises an insert 82 that is complimentary to the opening 78.

Preferably, the base 12 comprises a first lift module 16 and a second lift module 18. A plurality of joiners 84 is coupled to a pair of verticals 86 of the first lift module 16 and an associated pair of verticals 88 of the second lift module 18. The top 72 of the first lift module 16 is seamlessly joined with the top 72 of the second lift module 18.

In use, the opening in the top can be reveal by removing the insert. The lifter can raise or lower the platform within the interior space. The opening in the top is positioned to receive the mount when the platform is raised, and the holes in the mount are positioned to receive the couplers to attach the bases of machinery. Thus, when the machinery is required for use in can be brought to the level of said top using said lifter to raise said platform. When the machinery is not in use, it can be stowed in said internal space by using said lifter to lower said platform.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bench with integrated, liftable storage, said bench comprising:
   a base, said base comprising a lift module having:
      a frame, said frame being box shaped, said frame having a plurality of verticals extending from an upper face through and past a bottom, said bottom comprising a plurality of laterals, said upper face comprising a plurality of connectors;
      a platform, said platform being positioned in an interior space defined by said frame;
      a lifter, said lifter being positioned in said interior space, said lifter being coupled to said platform, wherein said lifter can raise or lower said platform within said interior space;
      a top, said top being positioned on and coupled to an upper face of said frame;
      an opening, said opening being positioned in said top;
      a set of four rack gears, each one of said set of four rack gears being coupled to a respective one of said verticals within said interior space;
      a set of three blocks, each block of said set of three blocks being coupled proximate to an associated corner of said platform;
      a motor, said motor being coupled to a fourth corner of said platform, said motor being positioned coplanar with said set of three blocks;
      a set of four pinion gears, three of said set of four pinion gears being directly coupled to associated ones of said blocks and to associated ones of said set of four rack gears, one of said set of four pinion gears being operationally coupled directly to said motor to define a single drive gear, said drive gear being operationally coupled to an associated one of said set of four rack gears; and
      a power supply, said power supply being coupled to an associated one of said verticals proximate to said top, said power supply being operationally coupled to said motor.

2. The bench of claim 1, further including said frame having four lateral sides, said lateral sides being open.

3. The bench of claim 1, further comprising
   each of said plurality of verticals, each of said plurality of laterals, and each of said connectors having a rectangular profile when viewed along a respective longitudinal axis.

4. The bench of claim 3, further including a plurality of bases, said bases being coupled to the bottom ends of said verticals.

5. The bench of claim 4, further including said bases being feet.

6. The bench of claim 5, further including said bases being wheels.

7. The bench of claim 6, further including said bases being castors.

8. The bench of claim 3, further comprising:
   said lift module being a first lift module, said base comprising said first lift module and a second lift module;
   a plurality of joiners, said joiners being coupled to a pair of verticals of said first lift module and an associated pair of verticals of said second lift module; and
   said top of said first lift module being seamlessly joined with said top of said second lift module.

9. The bench of claim 1, further including said platform being rectangular.

10. The bench of claim 1, further comprising:
    a mount, said mount being coupled to and positioned on an upper surface of said platform, said mount being positioned proximate to a front end of said platform, wherein said opening in said top is positioned to receive said mount when said platform is raised proximate to said top; and
    a plurality of holes, said holes being positioned in said mount, wherein said holes in said mount are positioned to receive the couplers to attach the bases of machinery.

11. The bench of claim 1, further including a control panel, said control panel being coupled to said power supply, said control panel being operationally coupled to said power supply and said motor.

12. The bench of claim 1, further comprising:
    said opening being positioned proximate to a front edge of said top;
    said opening being rectangular; and
    an insert, said insert being complimentary to said opening, wherein said opening in said top can be filled with said insert.

13. A bench with integrated, liftable storage, said bench comprising:
    a base, said base comprising a first lift module having:
       a frame, said frame being box shaped, said frame having a plurality of verticals extending from an upper face through and past a bottom,
       said frame having four lateral sides, said lateral sides being open,
       said bottom comprising a plurality of laterals, said upper face comprising a plurality of connectors, each of said plurality of verticals, each of said plurality of laterals, and each of said of connectors having a rectangular profile when viewed along a respective longitudinal axis,
       a plurality of bases, said bases being coupled to the bottom ends of said verticals, said bases being feet, said bases being wheels, said bases being castors,
       a platform, said platform being positioned in an interior space defined by said frame, said platform being rectangular,
       a mount, said mount being coupled to and positioned on an upper surface of said platform, said mount being positioned proximate to a front end of said platform,
       a plurality of holes, said holes being positioned in said mount,
       a lifter, said lifter being positioned in said interior space, said lifter being coupled to said platform, wherein said lifter can raise or lower said platform within said interior space, said lifter comprising:
          a set of four rack gears, each one of said set of four rack gears being coupled to a respective one of said verticals within said interior space,
          a set of three blocks, each said set of three blocks being coupled proximate to an associated corner of said platform, a motor, said motor being coupled to a fourth corner of said platform, said motor being positioned coplanar with said set of three blocks,
a set of four pinion gears, three of said set of four pinion gears being operationally coupled to associated ones of said blocks and to associated ones of said set of four rack gears, one of said set of four pinion gears being directly coupled to said motor defining a drive gear, said drive gear being operationally coupled to an associated one of said set of four rack gears,
a power supply, said power supply being coupled to an associated one of said verticals proximate to said top, said power supply being operationally coupled to said motor;
a control panel, said control panel being coupled to said power supply, said control panel being operationally coupled to said power supply and said motor;
a top, said top being positioned on and coupled to said upper face of said frame;
an opening, said opening being positioned in said top proximate to a front edge of said top, said opening being rectangular;
said base comprising said first lift module and a second lift module;
a plurality of joiners, said joiners being coupled to a pair of verticals of said first lift module and an associated pair of verticals of said second lift module;
said top of said first lift module being seamlessly joined with said top of said second lift module;
an insert, said insert being complimentary to said opening, wherein said opening in said top can be filled with said insert; and
wherein said lifter can raise or lower said platform within said interior space, said opening in said top is positioned to receive said mount when said platform is raised, and said holes in said mount are positioned to receive the couplers to attach the bases of machinery.

* * * * *